United States Patent [19]

Hirotsu et al.

[11] Patent Number: 4,799,161

[45] Date of Patent: Jan. 17, 1989

[54] CONTROL APPARATUS FOR MAINTAINING TRACTION IN ELECTRIC ROLLING STOCK

[75] Inventors: Tetsuji Hirotsu; Kiyoshi Nakamura; Syoji Kasai; Hiroshi Yamaguchi; Eiji Kozu, all of Katsuta, Japan

[73] Assignee: Hitachi, Ltd., Tokyo, Japan

[21] Appl. No.: 894,102

[22] Filed: Aug. 7, 1986

[30] Foreign Application Priority Data

Aug. 14, 1985 [JP] Japan .................................. 60-177529

[51] Int. Cl.$^4$ .............................................. B61C 15/08
[52] U.S. Cl. .................................. 364/426.01; 318/52; 180/197
[58] Field of Search ......................... 364/426; 180/197; 361/238; 318/52

[56] References Cited

U.S. PATENT DOCUMENTS

| | | | |
|---|---|---|---|
| 3,614,173 | 10/1971 | Branson | 318/52 |
| 3,658,388 | 4/1972 | Hasegawa | 318/52 |
| 4,136,303 | 1/1979 | Almquist et al. | 318/52 |
| 4,701,682 | 10/1987 | Hirotsu et al. | 364/426 |

Primary Examiner—Gary Chin
Attorney, Agent, or Firm—Antonelli, Terry & Wands

[57] ABSTRACT

The commencement of a developing period of slip is detected by the fact that a time-differential value $\dot{v}_s$ of a creep velocity $v_s$ (a relative velocity between a peripheral velocity $v_m$ of a driving wheel and a vehicle velocity $v_t$) exceeds a predetermined reference $\delta_1$. The termination of the developing period is detected by the fact that a time-differential value $\dot{v}_m$ of the peripheral velocity $\dot{v}_m$ becomes equal to zero. During the developing period, a torque command Tp to a main motor controller is decreased by a re-adhesion control signal Tfa which is formed by the combination of a time-dependent component $e_1$ and a slip-dependent component $e_2$. After termination of the developing period, the torque command Tp is decreased with time at an appropriate time constant. According to the present invention, the arithmetic logic operation for control can be much simplified without any deterioration of a adhesion performance of an electric vehicle.

16 Claims, 7 Drawing Sheets

CONTROL APPARATUS FOR MAINTAINING TRACTION IN ELECTRIC ROLLING STOCK

BACKGROUND OF THE INVENTION

1. Field of the Invention

The present invention relates to the improvement of a control apparatus for the traction of rolling stock which serves to effectually utilize the adhesive force (frictional force) between wheels of the rolling stock and rails as the tractive or braking force.

2. Description of the Related Art

It is well known that, since vehicles on rails obtain their tractive or braking force by virtue of the friction between the wheels thereof and the rails, slipping or skidding of the wheels will occur if the driving or braking torque goes beyond a limited value (a maximal adhesive force) defined by the coefficient of friction between the wheels and the rails. The slip occurring during power running is based on substantially a same phenomenon as the skid occurring at the time of braking. Thus, it should be possible to employ a single means as a way of preventing both. Accordingly, hereinafter, a description will be presented mainly based on an example of the operation in the power running of an electric vehicle, the especially different characteristics relative to the braking period will be described at the time needed.

Conventionally, various measures have been proposed in order to improve a re-adhesion control or traction recovery control, in which the nonadhesive state such as slip of driving wheels of an electric vehicle is removed by swiftly reducing the driving torque applied to the wheels when such state was detected. The conventional measures have an effect in the recovery of the nonadhesive state, however they have resulted in the fact that the driving torque or the braking force has been apt to be reduced too much for preventing the recurrence of nonadhesive state just after the recovery, and therefore the maximal adhesive force could not be effectively utilized for the tractive or braking force.

By the way, the following is known about the relationship of the traction force f with respect to the relative velocity $v_s$ between the peripheral velocity $v_m$ of a driving wheel and vehicle velocity $v_t$. The relative velocity $v_s$ ($=|v_m-v_t|$), which is usually called a creep velocity, increases as the traction force f increases with the driving torque. By further increasing the driving torque, the traction force f reaches its maximal value $f_{max}$, which is determined by the product $\mu W$ of the friction coefficient $\mu$ between the driving wheel and the surface of the rail and the axle weight W of the driving wheel. Further, the maximal traction force $f_{max}$ is equivalent to the aforesaid maximal adhesive force, which depends on the surface condition of the rail to a great extent.

After that, even though the driving torque is increased, the traction force f decreases, resulting in that only the creep velocity $v_s$ increases. In this manner, in the relationship of the traction force f versus the creep velocity $v_s$, there exists a specific creep velocity $v_{so}$ at which the traction force f becomes maximal. In the region of the creep velocity lower than $v_{so}$, the traction force f increases with the creep velocity $v_s$, and in the region of the creep velocity higher than $v_{so}$ the traction force f decrease with increase of the creep velocity $v_s$. Further, it is to be noted here that the existence of the creep velocity $v_s$, even if it is very small, means the existence of slip. Notwithstanding, the former region is not usually said to belong to the nonadhesive state. Such a status can be always observed during acceleration or deceleration of a vehicle, i.e., except the case where a vehicle continues to run at a constant velocity. Therefore, the former region is called the condition of a pseudo slip.

Then, noting the relationship of the traction force f versus the creep velocity $v_s$ as mentioned above, some of the applicants have proposed an improved system which can exhaustively utilize the maximal adhesive force for the tractive or braking force (U.S. patent application Ser. No. 820,327 filed Jan. 21, 1986, now U.S. Pat. No. 4,701,682). According thereto, the changing rate $\Delta v_s/\Delta t$ of the creep velocity $v_s$ with respect to time is obtained. Further, the changing rate $\Delta f/\Delta t$ of the traction force f produced in the driving wheel at that time is obtained from the armature current of a main driving motor. The driving torque produced by the main motor is so controlled as to be decreased when polarities of the changing rate $\Delta v_s/\Delta t$ in the creep velocity and that $\Delta f/\Delta t$ in the traction force are different from each other.

Namely, in the prior proposal mentioned above, by monitoring the polarities of these two changing rates, it is discriminated whether or not the driving torque produced by the main motor at that time causes the traction force f to exceed the maximal adhesive force $f_{max}$ ($=\mu W$). In other words, the traction control is conducted in such a way that the traction force f and the creep velocity $v_s$ are maintained at the maximal adhesive force $f_{max}$ and the aforesaid specific creep velocity $v_{so}$, respectively. Consequently, the excellent adhesion capability can be achieved. In the above mentioned prior proposal, however, the considerably large amount of arithmetic logic operation is required in order to obtain various control variables and discriminate the control status, so that a large scale of processing apparatus has become necessary for exclusive use in such arithmetic logic operation.

SUMMARY OF THE INVENTION

An object of the present invention is to provide a control apparatus for electric rolling stock which can simplify logic operation for control without deteriorating adhesion performance of the electric rolling stock. More particularly, the present invention has the object that provides a control apparatus which has an improved manner of producing and utilizing a signal for reducing the force applied to a wheel upon occurrence of nonadhesion state.

A feature of the present invention is in that, during the nonadhesion state of wheels, the force applied to the wheels is controlled divided into two periods, i.e., a developing period of nonadhesion during which the nonadhesion state continues developing and the force applied to the wheels remains larger than an adhesive force available at that time and a non-developing period during which the nonadhesion state is reduced toward the adhesion state and therefore the force applied to the wheels is within the limit of the maximal adhesive force available at that time. A re-adhesion control signal, which serves to amend an instruction to a control device of main motors driving the wheels upon occurrence of the nonadhesion state, is formed also divided into two portions, i.e., a first component for the developing period and a second component for the non-developing period. The first component comprises a nonadhesion-independent independent component and a nonadhesion-dependent component. The second component is decreased with time after the developing period of nonadhesion state has terminated.

DESCRIPTION OF THE PREFERRED EMBODIMENTS

Figure 1:
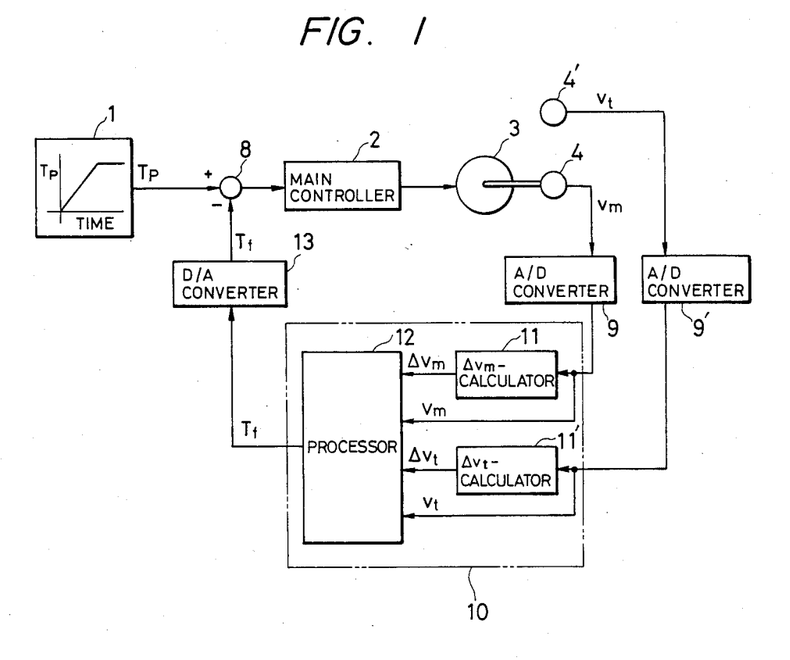
FIG. 1 is a block diagram schematically showing a control apparatus for an electric vehicle according to an embodiment of the present invention.

Referring to FIG. 1, there is shown a block diagram of a re-adhesion control apparatus according to an embodiment of the present invention. To facilitate matters, this figure shows an example, in which the re-adhesion control apparatus is applied to a main circuit of an electric vehicle having a single main driving motor and a single main control device for controlling the main motor.

In FIG. 1, reference numeral 1 denotes a torque command generator which produces a torque command Tp. Reference numeral 2 denotes a main controller, by which the torque generated by a main motor 3 is controlled in accordance with the torque command Tp. The main motor 3 drives driving wheels (not shown), so that the traction force is created at the periphery of the driving wheels. As well known, there are various types of the main controller 2, such as a thyrister converter for an alternating current electric vehicle, in which its output voltage is controlled by a firing phase angle control of thyristers, and a chopper or an inverter for a direct current electric vehicle.

Reference numeral 4 indicates a driving wheel peripheral velocity detector, which comprises a tachogenerator coupled to a driving axle and a waveform shaping device for shaping and processing the output of the tachogenerator, and which produces the voltage proportional to the peripheral velocity $v_m$ of the driving wheel. Reference numeral 4' indicates a vehicle velocity detector, which comprises a tachogenerator coupled to a trailing axle (which is not driven by a main motor and hence never slips) and a waveform shaping device, and which produces the voltage in proportion to the vehicle velocity $v_t$. To these velocity detectors 4 and 4', filters are preferably coupled, which remove noise caused by various kinds of vibrations during running of the vehicle.

Reference numeral 8 indicates a subtracter, which receives the torque command Tp and a re-adhesion control signal Tf as described later and produces a control signal to the main controller 2. Reference numerals 9 and 9' represent analog-to-digital (A/D) converters, in which the driving wheel peripheral velocity $v_m$ and the vehicle velocity $v_t$ are converted into digital signals, respectively. The converted signals are led to a processing unit 10.

The processing unit 10 comprises a $\Delta v_m$-calculator 11, a $\Delta v_t$-calculator 11' and a processor 12. The $\Delta v_m$-calculator 11 obtains $\Delta v_m$ which represents the difference between the value $v_m(n)$ of the driving wheel peripheral velocity $v_m$ at a sampling time point n and that $v_m(n-1)$ at the sampling time point preceding by one sampling period $\Delta t_s$ to the time point n. The value $\Delta v_m/\Delta t_s$, which is obtained by dividing the difference $\Delta v_m$ by the sampling period $\Delta t_s$, is equivalent to a driving wheel peripheral acceleration $\dot{v}_m$, and therefore $\Delta v_m/\Delta t_s$ can be utilized for $\dot{v}_m$ in the arithmetic logic operation in the processor 12. Similarly, the $\Delta v_t$-calculator 11' obtains $\Delta v_t$ which is the difference between the value $v_t(n)$ of the vehicle velocity $v_t$ at a sampling time point n and that $v_t(n-1)$ at the sampling time point preceding by one sampling period $\Delta t_s$ to the time point n. The value $\Delta v_t/\Delta t_s$ can be utilized for $\dot{v}_t$ in the arithmetic logic operation in the processor 12. Further, it is obvious to one of skill in the art that the calculators 11 and 11' described above can be substituted by such function provided within the processor 12 that is designed to calculate $\Delta v_m$ and $\Delta v_t$ from $v_m$ and $v_t$, respectively.

The processor 12 is formed by a known microprocessor, and its operation, although it will be explained in detail later, can be briefed as follows. By utilizing the driving wheel peripheral velocity $v_m$ and the vehicle velocity vt given from the A/D converters 9 and 9' respectively as well as the differences $\Delta v_m$ and $\Delta v_t$ thereof obtained by the respective calculators 11 and 11', the processor 12, at first, discriminates in what status the nonadhesive wheel is, namely, it is discriminated, for example, whether the slip of the driving wheel still continues developing or whether it is on the way of recovery (for the convenience of further explanation, the former status is called a developing period of the nonadhesive state and the latter a recovery period, hereinafter). Further, the processor 12 calculates and outputs the respective re-adhesion control signals Tf to be used during the developing period and the recovery period of the nonadhesive state. The re-adhesion control signal Tf obtained in the processing unit 10 is coupled to a digital-to-analog (D/A) converter 13, in which the signal Tf is converted into an analog signal and thereafter led to the subtracter 8, so that the torque generated by the main motor 3 is controlled by the main controller 2 on the basis of the difference $T_p - T_f$.

Figure 2:
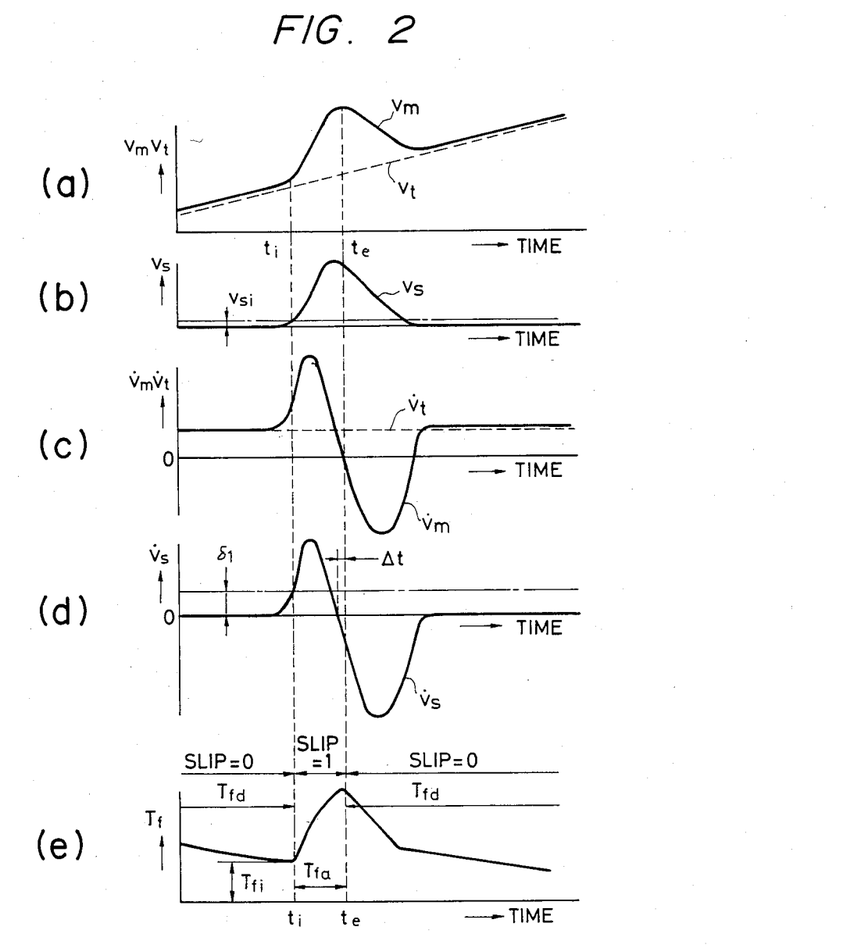
FIGS. 2(a) to 2(e) are diagrams showing a peripheral velocity $v_m$ of a driving wheel, a vehicle velocity $v_t$, a relative velocity $v_s$ (creep velocity) therebetween, their differential values $\dot{v}_m$, $\dot{v}_t$, $\dot{v}_s$, and a re-adhesion control signal Tf, for explaining the slip phenomenon and the operation of the present invention.

FIGS. 2(a) to 2(e) illustrate the waveforms of the various signals described above. When a vehicle continues to accelerate under the normal operational condition, the driving wheel peripheral velocity $v_m$ and the vehicle velocity $v_t$ gradually increase with time, as shown by lines $v_m$ and $v_t$ in FIG. 2(a). Here assuming that slip occurs in a certain driving wheel at a time point $t_i$, the peripheral velocity $v_m$ of the certain wheel rapidly increases, as shown by the line $v_m$ of FIG. 2(a), whereas the vehicle is almost linearly accelerated by other non-slipping driving wheels, as shown by the line $v_t$ of the same figure. As a result, the creep velocity $v_s$ also increases, as shown in FIG. 2(b). The increasing peripheral velocity $v_m$ of the certain driving wheel reaches the peak value at a certain time point $t_e$, and thereafter decreases by virtue of the re-adhesion control or traction recovery control described later, so that the creep velocity $v_s$ also decreases. When the decreasing peripheral velocity $v_m$ becomes equal to the vehicle velocity $v_t$ at that time, as shown in FIG. 2(a), the certain driving wheel adheres to the rail again, and the creep velocity $v_s$ disappears, as shown in FIG. 2(b).

From the peripheral velocity signal $v_m$ and the vehicle-velocity signal $v_t$ as shown in FIG. 2(a), signals $\dot{v}_m$ and $\dot{v}_t$ (actually $\Delta v_m/\Delta t_s$ and $\Delta v_t/\Delta t_s$) as shown in FIG. 2(c) are obtained by the respective calculators 11 and 11'. Also, a signal $v_s$ as shown in FIG. 2(d) is obtained by differentiating the creep velocity signal $v_s$ shown in FIG. 2(b) or as the difference between the signals $\dot{v}_m$ and $\dot{v}_t$. The occurrence of slip can be detected by comparing the differentiated value $\dot{v}_s$ of the creep velocity $v_s$ with a reference value $\delta_1$. It is determined that slip occurs, when the level of the signal $\dot{v}_s$ exceeds the reference value $\delta_1$.

By the way, the period from the time point $t_i$ at which slip occurs to the time point te at which the peripheral velocity $v_m$ reaches the peak value corresponds to the aforesaid developing period of slip. A variable SLIP which represents the status of the wheel is defined, and its value is made 1 for this period (cf. FIG. 2(e)). In this developing period, the driving torque needs to be immediately reduced to suppress slip, because the traction force generated at that time exceeds the adhesive force. On the other hand, the remaining period except the developing period is called a non-developing period, and for which the variable SLIP is assigned zero (FIG. 2(e). In this non-developing period, two cases are included; one is the aforesaid recovery period, during which the peripheral velocity $v_m$ of a slipping driving wheel is decreasing toward adhesion, and the other is the case of the pseudo slip, in which, as already described, the creep velocity $v_s$ is lower than its specific value $v_{so}$ at which the maximal adhesive force $f_{max}$ can be gained. In the non-developing period, the driving torque is desirable to be restored up to its normal value at the appropriate rate which is as large as possible.

The control of the driving torque as mentioned above is conducted based on the re-adhesion control signal Tf as shown in FIG. 2(e), which reduces the torque command Tp in order to reduce the traction force generated at the periphery of the slipping driving wheel. As shown in the figure, when the variable SLIP is 1, i.e., during the developing period of slip, the signal Tf is rapidly increased, so that the torque command Tp quickly decreases, and, to the contrary, when the variable SLIP is zero, i.e., during the non-developing period, the signal Tf is decreased at the appropriate rate, so that the torque command $T_p$, and therefore the driving torque, is restored accordingly. For the convenience of the later explanation, the signal Tf during the developing period of slip is represented by Tfa and that during the non-developing period by Tfd. Further, the creep velocity $v_s$ and the re-adhesion signal Tf at the time when slip occurs are represented by $v_{si}$ and Tfi, respectively.

Figure 3:
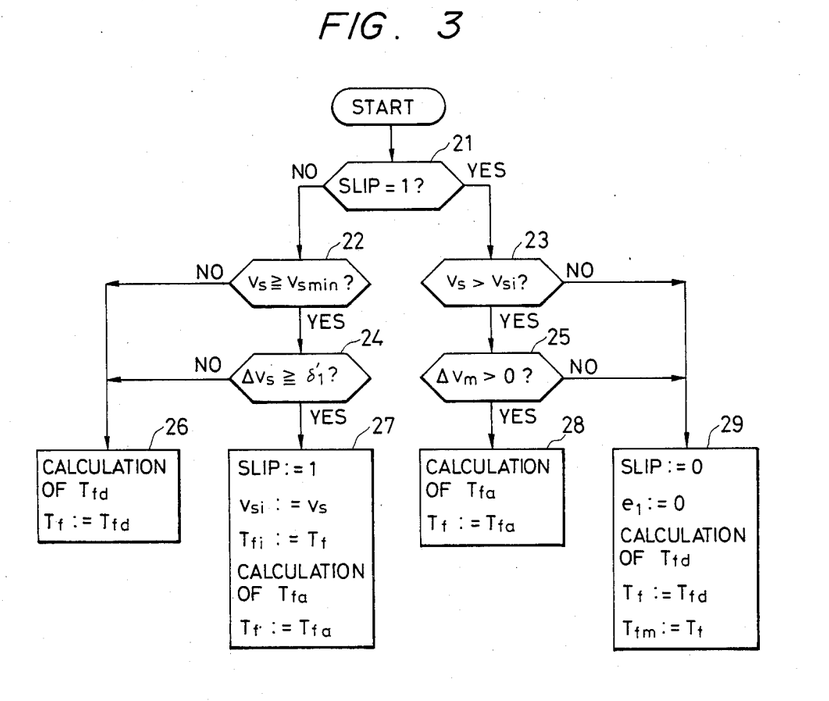
FIG. 3 is a flow chart illustrating the arithmetic logic operation of a processor utilized in the embodiment of FIG. 1.

Referring next to FIG. 3, the content of the arithmetic logic operation in the processor 12 will be explained. In a flow chart shown, a symbol [: —] (cf. steps 26 to 29) means that the value of the right term of a formula including this symbol is stored in an area of storage means of the processor 12 which is assigned to the variable of a left term of the corresponding formula.

In FIG. 3, when the operation starts, the area SLIP of the storage is first of all referred to, and it is checked at step 21 whether its content is 1 or not, namely, whether or not the adhesion state of wheels is in the developing period of slip. If SLIP≠1, the operation goes to step 22, at which the creep velocity $v_s$ is compared with a reference value $v_{smin}$. The reference value $v_{smin}$ is set in view of the noise component included in the output of the velocity detectors 4 and 4', which is caused mainly by the vibration of the vehicle. Usually, it is selected to be lower than the creep velocity $v_{so}$, at which the maximal adhesive force $f_{max}$ is gained. Further, the noise component included in the output of the velocity detectors 4 and 4' tends to increase with the vehicle velocity $v_t$, and hence it is preferable that the reference $v_{smin}$ is also increased with the vehicle velocity $v_t$.

At step 22, when $v_s < v_{smin}$, the driving wheel is regarded as in the non-developing period, and the operation proceeds to step 26, at which the re-adhesion control signal Tfd for the non-developing period is calculated and stored in the area Tf of the storage. At this step, when $v_s \geq v_{smin}$, the operation advances to step 24, at which the difference $\Delta v_s$ of the creep velocity $v_s$ is compared with a reference value $\delta'1$. The reference value $\delta'1$ here corresponds to the reference value $\delta_1$ as shown in FIG. 2(d), and equals the product of the value $\delta_1$ and the sampling period $\Delta t_s$. This results from the fact that the difference $\Delta v_s$ is utilized in place of the differentiated value $\dot{v}_s$. Further, the calculation of the re-adhesion signal Tfd mentioned above will be explained in detail later.

At step 24, when $\Delta v_s < \delta'1$, the driving wheel is regarded as in the non-developing period, and the operation goes to step 26. However, when $\Delta v_s \geq \delta'1$, the operation proceeds to step 27. Namely, when the difference $\Delta v_s$ exceeds the reference $\delta'1$, the developing period of slip in the driving wheel is considered to commence, and the variable SLIP is set at 1, which is stored in the storage area assigned to the variable. Further, the creep velocity $v_s$ and the re-adhesion control signal Tf at that time are also stored in respective storage areas $v_{si}$ and Tfi. Furthermore, the re-adhesion control signal Tfa for the developing period is calculated and stored in a storage area Tf. The calculation of the re-adhesion control signal Tfa will be explained in detail later, too.

The explanation will be returned back to step 21. At that step, when SLIP=1, the operation goes to step 23, where the creep velocity $v_s$ is compared with the reference $v_{si}$ shown in FIG. 2(b).

At step 23, when $v_s > v_{si}$, the operation proceeds to step 25, at which the sign of the difference $\Delta v_m$ of the peripheral velocity of the driving wheel is checked. If the difference $\Delta v_m$ is positive, the driving wheel is regarded as in the developing period of slip, because the positive $\Delta v_m$ means the increasing peripheral velocity $v_m$ of the driving wheel. Then, the operation goes to step 28. At step 28, the re-adhesion control signal Tfa for the developing period of slip is calculated and stored in the storage area Tf. At step 23, when $v_s \leq v_{si}$, the driving wheel is regarded as in the non-developing period, and at step 25, when $\Delta v_m < 0$, the developing period of slip in the driving wheel is considered to be over. In both cases, the operation goes to step 29, at which the variable SLIP is made zero, and the re-adhesion control signal Tfd for the non-developing period is calculated and stored in the storage area Tf. A method of calculating the re-adhesion control signals Tfa and Tfd mentioned above will be also explained in detail later.

Further, the step 23 is provided in order to prevent the traction force from being seriously damaged by the misjudgement of occurrence of slip. As described above, the determination of occurrence of slip is conducted by comparing the difference $\Delta v_s$ of the creep velocity with the reference $\delta'_1$ (cf. step 24). If the occurrence of slip is mistakenly determined at step 24, the driving torque generated by the main motor is reduced in response thereto. As a result, the creep velocity $v_s$ decreases to become lower than the reference $v_{si}$. This situation is checked at step 23, and the operation goes to step 29, so that the reduction of the driving torque is stopped immediately, and the normal operational condition is restored. If there are provided filters capable of removing the noise included in the output of the velocity detectors 4 and 4' and the reference $\delta'_1$ is selected appropriately, steps 22 and 23 may be omitted. However, the provision of these steps is advantageous, because they have an effect in the prevention of malfunction and the fast restoration to the normal operational condition, as mentioned above, resulting in that slip can be detected with the high sensitivity and therefore the performance of the re-adhesion control apparatus can be much improved.

Furthermore, since there is a relationship $\dot{v}_s = \dot{v}_m - \dot{v}_t$, if the acceleration $\dot{v}_t$ of the vehicle is sufficiently small, there is established the relationship $\dot{v}_s = \dot{v}_m$. Accordingly, the difference $\Delta t$ between the time at which $\dot{v}_m$ becomes zero and the time at which $\dot{v}_s$ becomes zero is very small, compared with the time duration from $t_i$ to $t_e$, as shown in FIG. 2(d). In this case, step 25 in the flow chart of FIG. 3 can be replaced by the discriminating step of $\Delta v_s > 0$. That is, the operation is advanced to step 29 by regarding the developing period of slip as being over when the difference $\Delta v_s$ of the creep velocity is zero or negative ($\Delta v_s \leq 0$).

The flow chart of FIG. 3 illustrates an example of the arithmetic logic operation, in which the developing period of slip and the non-developing period are discriminated by using the creep velocity $\dot{v}_s$, however this discrimination can be achieved by the peripheral velocity $v_m$ only, without utilizing the creep velocity $\dot{v}_s$. The occurrence of slip can be determined by the fact that the driving wheel peripheral acceleration $\dot{v}_m$ (or $\Delta v_m$) has become larger than the value (reference $\delta''_1$) that is usual under the normal running status of the vehicle, and the termination of the developing period of slip can be detected by the fact that the peripheral acceleration $\dot{v}_m$ of the driving wheel has become zero or negative. The reference $\delta''_1$ needs to be by the amount corresponding to the usual vehicle acceleration larger than the aforesaid reference $\delta'_1$. As a result, the sensitivity in the slip detection may be somewhat deteriorated, however the re-adhesion control apparatus becomes simple in its construction, because the vehicle velocity detector is not needed.

The occurrence of slip can be also detected by the level of the creep velocity $v_s$ itself. As already stated, the maximal adhesive force $f_{max}$ and the creep velocity $v_{so}$ at which $f_{max}$ is given vary in accordance with the surface condition of the rail. Then, the average value $v_{sopt}$ of the creep velocity $v_s$ is determined, and when the detected creep velocity $v_s$ exceeds $v_{sopt}$, it is regarded as the occurrence of slip. Since $v_{so}$ tends to increase with the vehicle velocity $v_t$, $v_{sopt}$ is desirable to change in response to the vehicle velocity $v_t$.

Figure 4:
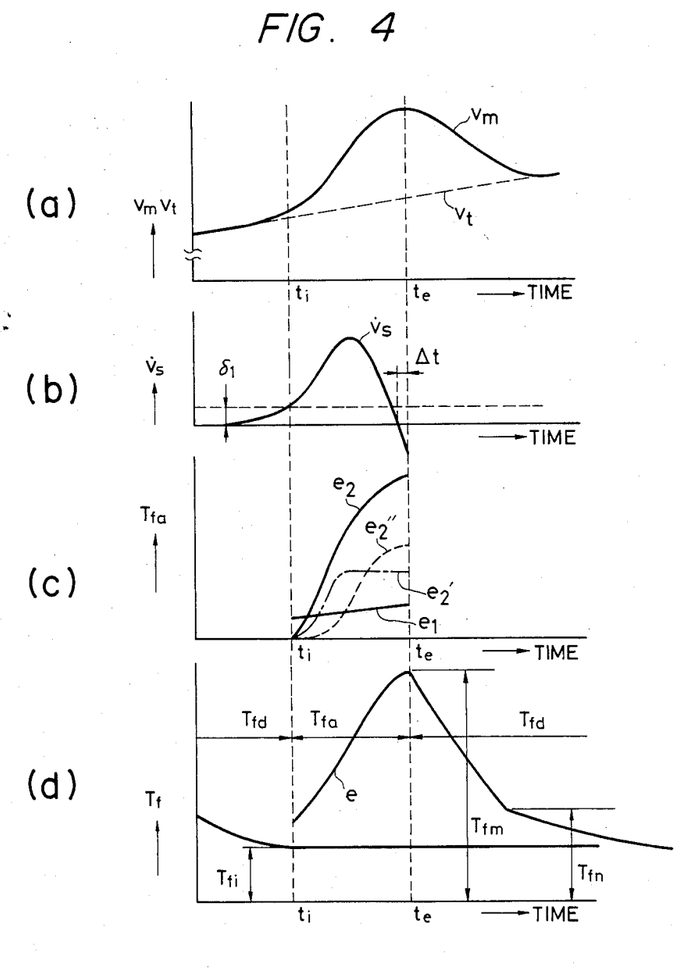
FIGS. 4(a) to 4(d) are diagrams for explaining the principle of forming the re-adhesion control signal Tf.

Referring next to FIGS. 4(a) to 4(d), the explanation will be made of the method for calculating the re-adhesion control signal Tf, i.e., Tfa for the developing period of slip and Tfd for the non-developing period. In these figures, FIGS. 4(a) and 4(b) correspond to FIGS. 2(a) and 2(d), however FIG. 4(b) shows only a part of FIG. 2(d), i.e., a part of the developing period of slip. Also, FIG. 4(d) corresponds to FIG. 2(e), in which, however, the re-adhesion control signal Tf is illustrated further in detail. FIG. 4(c) shows only the re-adhesion control signal Tfa for the developing period of slip.

In this embodiment, the re-adhesion signal Tf is formed by the summation of the value of the re-adhesion control signal Tfi, which has been held upon occurrence of slip, and an additional component. The additional component includes a slip-dependent component and a time-dependent (therefore, slip-independent) component.

First of all, the explanation will be done of the additional component in the re-adhesion control signal Tfa for the developing period of slip. As shown in FIG. 4(c), the time-dependent or slip-independent component $e_1$ includes a constant portion (bias portion) and a portion increasing with time. In the usual slip phenomenon, the creep velocity $v_s$ rises relatively slowly just after occurrence of slip, as shown in FIG. 4(b), so that various signals relative to the slip phenomenon are small. In such a duration, the slip-independent component signal $e_1$ functions effectually, and the slipping wheel can be adhered to the rail within small slippage again.

However, as mentioned above, the characteristic of the adhesive force f versus the creep velocity $v_s$ widely varies in accordance with the condition between the rail surface and the driving wheel, and therefore only the time-dependent component $e_1$ can not sufficiently cope with the wide variation in the $f-v_s$ characteristic. Then, the slip-dependent component signal $e_2$ is provided in order to always adapt the re-adhesion control signal Tf in response to the variation in the $f-v_s$ characteristic.

The slip-dependent component signal $e_2$ in this case is formed as follows. This signal also includes two components; one ($e'_2$) is relative to the differential value $v_s$ of the creep velocity and the other ($e''_2$) is dependent on the creep velocity $v_s$ itself. As apparent from FIG. 4(c), the component $e'_2$ is in proportion to $\dot{v}_s - \delta_1 v_s$ when continues to increase, however it is maintained at its maximum after $\dot{v}_s$ begins to decrease The component $e''_2$ is proportional to $v_s - v_{si}$. The slip-dependent component $e_2$ is formed by the summation of $e'_2$ and $e''_2$, and therefore it varies with respect to time as $e_2$ shown in FIG. 4(c).

To sum up, the calculation formula of the re-adhesion control signal Tfa in this case is expressed as follows:

$$Tfa = Tfi + e_1(n) + e_2$$

where $$e_1(n) = G_0 + e_1(n-1) + \Delta e_1$$

$$e_2 = G_1(\Delta v_s - \delta'_1) + G_2(v_s - v_{si})$$

In the above formulae, $e_1(n)$ represents the value of $e_1$ at a sampling time point n, $\Delta e_1$ an increment of $e_1$ for one sampling period, and $G_0$, $G_1$ and $G_2$ constants.

Next, the re-adhesion control signal Tfd for the non-developing period will be explained. Although the tendency of decreasing Tfd can be arbitrarily selected, however assuming here that Tfd is decreased with the time lag of first order, the following difference equation is given:

$$\tau\{Tfd(n) - Tfd(n-1)\}/\Delta t_s + Tfd(n) = 0$$

where $\tau$ denotes a time constant and Tfd(n) represents the value of Tfd at the sampling time point n. From the above formula, the following relationship can be led:

$$Tfd(n) = \{\tau/(\Delta t_s + \tau)\} \cdot Tfd(n-1)$$

Further, in this embodiment, the time constant $\tau$ is changed in accordance with the level of the re-adhesion control signal Tfd itself. Namely, as shown in FIG. 4(d), when Tfd is larger than a certain level Tfn, the relatively small time constant is selected, and when Tfd≦Tfn, the time constant is set to be sufficiently large. With the thus determined time constants, after the termination of the developing period of the nonadhesion state, the traction force is swiftly recovered near to the maximal adhesive force developed at the location where the vehicle runs at that time, and thereafter the traction force is increased gradually so that slip does not recur. The level Tfn at which the time constant $\tau$ is changed is determined as follows. The maximal adhesive force at the location where the vehicle runs at present can be estimated from the re-adhesion control signal Tfi, because slip has occurred when the driving torque reached the value corresponding to $T_p - Tfi$. Accordingly, it can be estimated with the following formula, for example:

$$Tfn = Tfi + \epsilon(Tfm - Tfi)$$

where $\epsilon$ is a constant and preferable to be selected around 0.2 according to the inventors' experiment.

Figure 5:
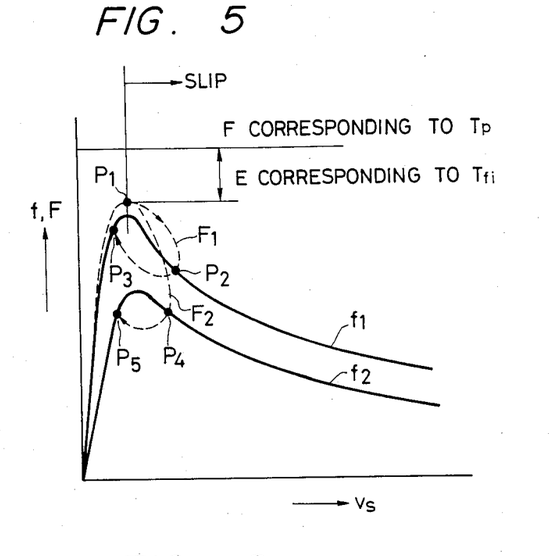
FIG. 5 is a diagram for explaining the effect of the embodiment of FIG. 1.

Referring to FIG. 5, the manner of the operation of this embodiment will be explained from the different point of view. FIG. 5 shows the well known characteristics of the adhesive force f with respect to the creep velocity $v_s$. In addition, in the figure, the behaviour of the driving force F (driving torque/radius of driving wheel) as the result of control by this embodiment is illustrated by broken lines. The behaviour of the driving force F when the $f - v_s$ characteristic is $f_1$ is shown by the broken line $F_1$, and the behaviour thereof when the $f - v_s$ characteristic is abruptly changed from $f_1$ to $f_2$ is shown by the broken line $F_2$.

Assuming now that the $f - v_s$ characteristic is $f_1$, the driving force F at the instant of occurrence of slip is indicated by a point $P_1$. The value of the driving force F at that point corresponds to the difference between the torque command Tp and the re-adhesion control signal Tfi when slip occurs. As described above, the re-adhesion control signal Tf is increased upon occurrence of slip, and the driving force F is decreased as shown by $F_1$. However, during $F_1 > f_1$, the peripheral velocity $v_m$ continues to increase ($\dot{v}_m > 0$) until the decreasing $F_1$ becomes equal to $f_1$ at that time. At a point $P_2$ at which $F_1$ becomes equal to f1 and the developing period of slip is over, the re-adhesion control signal Tf ceases from increasing. However, due to the delay factor existing in a main motor, a main control apparatus, filters provided for a velocity detector, etc., the driving force $F_1$ decreases somewhat lower that the point $P_2$, resulting in $F_1 < f_1$. As a result, the peripheral velocity $v_m$ begins to decrease and the driving force F changes as shown by an arrow of the broken line $F_1$ in the figure. Namely, the slipping wheel passes through the condition of the point $P_2$ and again adheres under the condition of a point $P_3$ on the $f - v_s$ characteristic line $f_1$.

If during the developing period of slip the re-adhesion control signal Tf is increased too fast and up to the unnecessarily large value, the driving force F decreases much lower than the point $P_2$ due to the delay factor existing in the whole system. Then, according to the present embodiment, in the case where there exists no abrupt change in the condition between the wheel and the rail surface, the driving force F is reduced mainly by the function of the slip-independent component $e_1$. When the surface condition of the rail changes abruptly and the $f - v_s$ characteristic deteriorates from $f_1$ to $f_2$ as shown in FIG. 5, the re-adhesion control signal Tf is so formed as to be able to cope with the rapid and big deterioration in the $f - v_s$ characteristic, by virtue of the function of the slip-dependent component $e_2$. Accordingly, the driving force F changes as shown by an arrow of the broken line $F_2$ in the figure. Namely, the slipping wheel passes through the condition of a point $P_4$ on the $f - v_s$ characteristic line $f_2$ and adheres under the condition of a point $P_5$.

Figure 6:
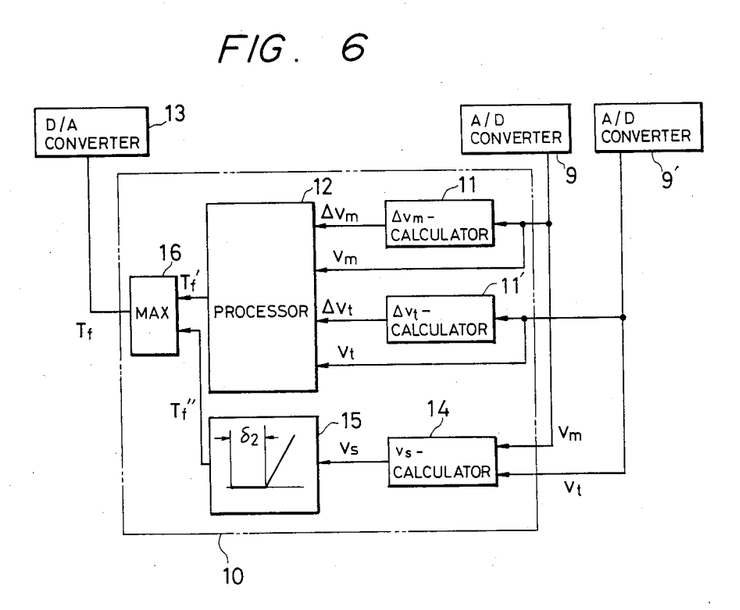
FIG. 6 is a block diagram schematically showing another embodiment of the present invention.

Referring next to FIG. 6, another embodiment of the present invention will be explained hereinafter. In the figure, only parts different from FIG. 1 and parts relative thereto are shown. Those are a $v_s$-calculator 14, a signal generator 15 and a high value selector 16. The remaining parts in this figure are quite the same as those denoted by the same reference numerals in FIG. 1.

The $v_s$-calculator 14 obtains the creep velocity $v_s$ by using the peripheral velocity $v_m$ of the driving wheel and the vehicle velocity $v_t$ supplied from the A/D converters 9 and 9', respectively. The signal generator 15 generates a creep velocity suppressing signal Tf'', when the creep velocity $v_s$ exceeds a predetermined reference value $\delta_2$. The reference $\delta_2$ is set so as to be somewhat larger than the aforesaid $v_{sopt}$ or an average valve of $v_{so}$ in the wet rail condition. The high value selector 16 selects either a signal Tf' from the processor 12 and the signal Tf'' from the signal generator 15 that has the higher value and produces the selected signal as the re-adhesion control signal Tf to the D/A converter 13. Further, although the output of the processor 12 here is represented by Tf', this is the same in its nature as Tf in the embodiment of FIG. 1. However, as Tfi or Tfm in the flow chart of FIG. 3 showing the operation of the processor 12 (cf. steps 27 and 29), the output Tf of the high value selector 16, not the output Tf' of the processor 12, is utilized.

With the addition of parts described above, the present embodiment has an effect in such slip as its velocity increases so slowly that $\Delta v_s$ never exceeds the reference $\delta'_1$, which is set for the detection of slip (FIG. 2(d) and step 24 of FIG. 3). Such slip often occurs, when the vehicle runs on the oily rail. In the case of such surface condition of the rail, the adhesive force f versus creep velocity vs characteristic has no definite peak value and becomes plateau-like. When the creep velocity $v_s$, even though slowly, increases to exceed $\delta_2$, the signal generator 15 produces Tf" proportional to $v_s - \delta_2$ so that the driving torque can be reduced accordingly. Also, in the case where slip fails to be suppressed by the output Tf' of the processor 12, the creep velocity $v_s$ is prevented from increasing too much, because the re-adhesion control signal Tf is increased by the output Tf" of the signal generator 15, when the creep velocity $v_s$ exceeds $\delta_2$.

To facilitate matters, the foregoing explanation has been made of the case where the main circuit of a vehicle to which the embodiments have been applied has a single main motor controlled by a single main control apparatus. In the following is described with the aid of FIGS. 7 to 10, various modes of implementation by which the present invention is applied to an electric vehicle having a plurality of main motors.

Figure 7:
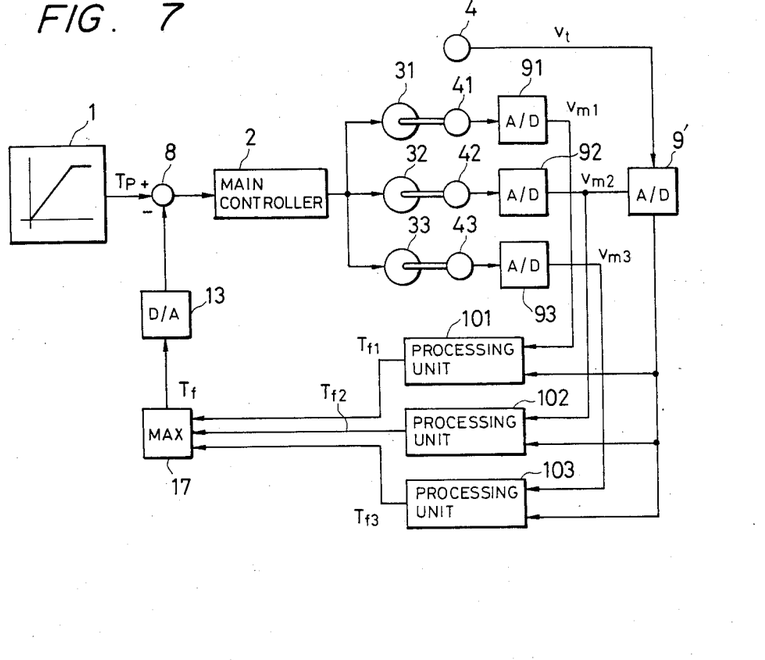
FIG. 7 is a block diagram schematically showing a third embodiment, in which the present invention is applied to an electric vehicle having a plurality of driving motors.

At first, FIG. 7 shows an example of three main motors 31, 32 and 33 controlled by the main control apparatus 2. To these motors coupled are velocity detectors 41, 42 and 43, respectively. The outputs of the detectors 41, 42 and 43 are converted into digital signals by respective A/D converters 91, 92 and 93 and supplied for processing units 101, 102 and 103, respectively. As another input of these processing units, the vehicle velocity $v_t$ is given through the A/D converter 9' from the velocity detector 4' which is coupled to a non-driving axle. The processing units 101, 102 and 103 are the same as those in the foregoing embodiments, which receive the vehicle velocity $v_t$ and corresponding peripheral velocities $v_{m1}$, $v_{m2}$ and $v_{m3}$ of driving wheels, execute the already described arithmetic logic operations, and produce respective re-adhesion control signals $f_1$, $Tf_2$ and $Tf_3$. The outputs of the processing units 101, 102 and 103 are led to a maximal value selector 17, in which any thereamong that is of a maximum is selected. The selected signal is utilized for the re-adhesion control signal. With this construction, the same re-adhesion control or traction recovery control as described with reference to the preceding embodiments can be achieved, even if slip occurs at any main motor.

Figure 8:
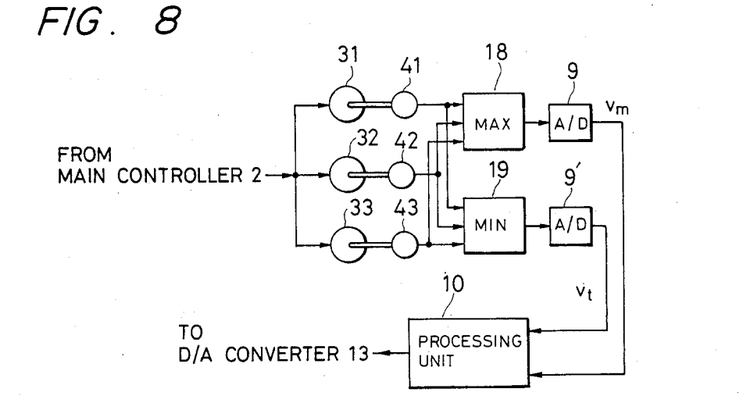
FIG. 8 is a block diagram schematically showing a part of a fourth further embodiment of the present invention, which has also plural main motors, but is simplified, compared with that of FIG. 7.

The arrangement of FIG. 7 can be further simplified as follows. As shown in FIG. 8, there are provided a maximal value selector 18 and a minimal value selector 19, which select the maximum and the minimum in the outputs of the three velocity detectors 41, 42 and 43, respectively. The outputs of the selectors 18 and 19 are converted into digital signals by the A/D converters 9 and 9' connected to the respective selectors 18 and 19. In this case, the output of the A/D converter 9 can be regarded as being equivalent to the peripheral velocity $v_m$ of a slipping wheel, and the output of the A/D converter 9' as the vehicle velocity $v_t$. By using the thus obtained $v_m$ and $v_t$, the processing unit 10 can calculate the re-adhesion control signal Tf in accordance with the algorithm described with reference to the foregoing embodiments. According to this embodiment, the same effect can be accomplished, as long as slip does not occurs simultaneously at all wheels coupled to the motors 31, 32 and 33. Practically, however, slip or skid seldom or never occurs at all the wheels simultaneously. Further, as apparent from the figure, the present embodiment is very simple in the structure, compared with that of FIG. 7.

Here, it is to be noted that, during braking, the output of the maximal value selector 18 corresponds to the vehicle velocity $v_t$ and that of the minimal value selector 19 to the peripheral velocity $v_m$ of a skidding wheel. In this case, therefore, there is needed means for exchanging the input signals to the processing units 10 or the processing unit 10 must have the function equivalent thereto, in order to cope with slip during power running and skid during braking.

Figure 9:
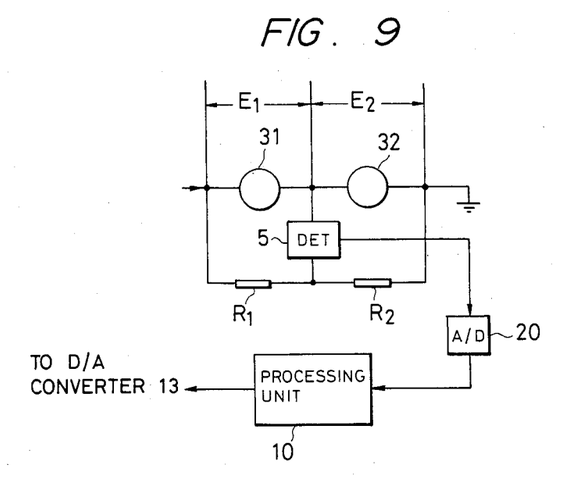
FIG. 9 is a block diagram schematically showing a part of a fifth embodiment of the present invention, in which the present invention is applied to a main circuit of an electric vehicle including a series connection of main motors.

If there is included in the main circuit of an electric vehicle a series connection of main motors, the creep velocity $v_s$ can be directly detected in the way as shown in FIG. 9. This case utilizes the fact that the peripheral velocities of wheels can be detected by the voltages appearing across corresponding main motors coupled to the wheels. As shown in FIG. 9, the series connection of the motors 31 and 32 and the series connection of resisters $R_1$ and $R_2$ form a known bridge circuit, and there is provided a voltage detector 5 between respective connecting points of the two series connections. During normal running, whether power running or braking, the voltages $E_1$ and $E_2$ across the motors 31 and 32 are almost equal to each other, and under such condition, the bridge circuit can be made to be balanced by selecting the values of the resisters $R_1$ and $R_2$ appropriately, so that the detector 5 produces no output signal. If slip or skid occurs at either the motors 31 and 32, the voltages $E_1$ and $E_2$ becomes different from each other, so that the detector 5 produces an output signal depending on the difference in the voltages $E_1$ and $E_2$, which difference is in proportion to the creep velocity $v_s$. The output signal of the detector 5 is converted into a digital signal by an A/D converter 20 and led to the processing unit 10.

Figure 10:
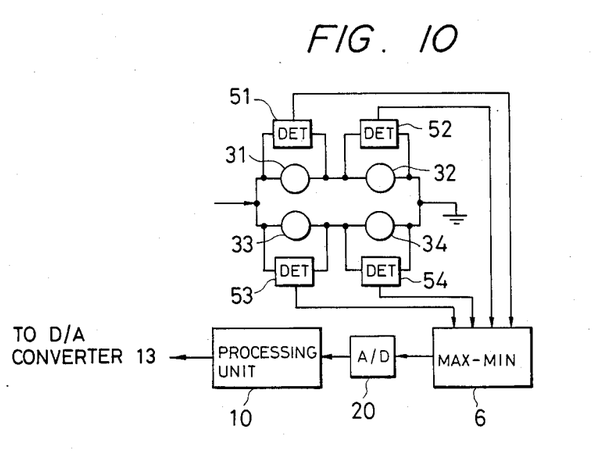
FIG. 10 is a block diagram schematically showing a part of a sixth embodiment of the present invention, in which voltages across main motors are detected in place of the velocities of the wheels driven by the main motors.

Furthermore, as shown in FIG. 10, it is also possible that the voltages of the main motors 31 to 34 are detected by corresponding voltage detectors 51 to 54 and a maximal difference detector 6 detects the maximal difference in the detected voltages, which can be utilized as the creep velocity $v_s$.

As described above, according to the present invention, the maximal adhesive force between wheels of a vehicle and the surface of a rail available at that time can be effectively utilized for traction force or braking force. Accordingly, in the case of electric locomotives, the traction capability thereof can be much enhanced. In the case of electric cars, the number of motor cars included in one train can be decreased, or if the same number of motor cars are included in a train, the acceleration or the deceleration of the train can be improved as a whole. Further, because slip or skid is suppressed before it becomes serious, abrasion of wheels and rail is reduced.

Although there have been herein shown and described only several forms of apparatuses embodying the present invention, it is understood that various changes and modifications may be made therein within the scope of the appended claims without departing from the spirit and scope of the present invention.

We claim:

1. A control apparatus for electric rolling stock, comprising:
    at least one electric motor for driving the rolling stock;

torque command generating means for generating a command $T_p$ for a driving torque during power running of the rolling stock and for a braking torque during braking of the rolling stock, and for controlling said electric motor in accordance therewith;

first velocity detection means for detecting a peripheral velocity $v_m$ of a wheel of the rolling stock, to which the driving or braking force F is applied;

second velocity detection means for detecting a velocity $v_t$ of the rolling stock;

processing unit means for receiving signals representative of the velocities $v_m$ and $v_t$ produced by said first and second velocity detection means and for producing a re-adhesion control signal in accordance therewith, said processing unit means including means for comparing the velocities $v_m$ and $v_t$ and for producing an adhesion-state-relative signal $v_s$ in accordance therewith, means for discriminating on the basis of the adhesion-state-relative signal $v_s$ whether or not the wheels, to which the driving or braking force F is applied, are in a developing period of a nonadhesion state in which the force F remains larger than an adhesive force available at a location of a rail where the rolling stock is now running, and for producing, when it is discriminated that the nonadhesion state of the wheels is in the developing period on the basis of a calculation using the adhesion-state-relative signal $v_s$, the re-adhesion control signal Tf including a nonadhesion-independent component $e_1$ which is produced upon occurrence of the nonadhesion state of the wheels and changes in its magnitude independently from the adhesion-state-relative signal $v_s$ and a nonadhesion-dependent component $e_2$ which changes in its magnitude in accordance with the adhesion-state-relative signal $v_s$, and for producing after it is discriminated that the developing period of the nonadhesion state is terminated and is in a nondeveloping period of nonadhesion, the re-adhesion control signal Tf including a component decreased with a certain time constant; and control means, responsive to a torque reference obtained by correcting the torque command $T_p$ based on the re-adhesion control signal Tf, for controlling the driving or braking torque produced by said at least one electric motor to regulate the driving or braking force F applied to wheels of the rolling stock.

2. A control apparatus for a rolling stock as defined in claim 1, wherein the commencement of the developing period of nonadhesion state is detected, when the adhesion-state-relative signal ($v_s$) becomes larger than a certain value ($v_{smin}$) determined based on noise included in the peripheral velocity ($v_m$) and the vehicle velocity ($v_t$) and a rate of change in the adhesion-state-relative signal ($v_s$) with respect to time exceeds a predetermined reference value ($\delta_1$).

3. A control apparatus for a rolling stock as defined in claim 1, wherein the commencement of the developing period of nonadhesion state is detected when the adhesion-state-relative signal ($v_s$) exceeds a reference value ($v_{sopt}$), which is changed in accordance with the vehicle velocity ($v_t$).

4. A control apparatus for a rolling stock as defined in claim 1, wherein the commencement of the developing period of nonadhesion state is detected when an absolute value of rate of change in the peripheral velocity ($v_m$) of a nonadhesive wheel with respect to time exceeds a predetermined reference value.

5. A control apparatus for a rolling stock as defined in claim 1, wherein the commencement of the developing period of nonadhesion state is detected when the adhesion-state-relative signal equal to or larger than the adhesion-state-relative signal at the time of occurrence of the nonadhesion state.

6. A control apparatus for a rolling stock as defined in claim 1, wherein the termination of the developing period of nonadhesion state is detected when rate of change in the peripheral velocity ($v_m$) of a nonadhesion wheel with respect to time is negative or equal to zero in the power running of the rolling stock and is positive or equal to zero in the braking of the rolling stock.

7. A control apparatus for a rolling stock as defined in claim 1, wherein the termination of the developing period of nonadhesion state is detected when a rate of change in the adhesion-state-relative signal ($v_s$) with respect to time is negative or zero.

8. A control apparatus for a rolling stock as defined in claim 1, wherein the re-adhesion control signal for the developing period of nonadhesion state is formed by the summation of the re-adhesion control signal, a time-dependent component increasing with time and the nonadhesion-dependent component ($e_2$).

9. A control apparatus for a rolling stock as defined in claim 8, wherein the time-dependent component is biased by a constant value.

10. A control apparatus for a rolling stock as defined in claim 8, wherein the nonadhesion-dependent component ($e_2$) includes a component proportional to an increasing part of the time-differential value ($\dot{v}_s$) of the adhesion-state-relative signal ($\dot{v}_s$) and a component proportional to the adhesion-state-relative signal ($v_s$).

11. A control apparatus for a rolling stock as defined in claim 1, wherein the time constant ($\tau$) of the re-adhesion control signal for the non-developing period is changed to a value larger than the preceding one, when the re-adhesion control signal decreases down to a predetermined level (Tfn).

12. A control apparatus for a rolling stock as defined in claim 11, wherein the predetermined level (Tfn) is determined as follows:

Tfn=Tfi+ϵ(Tfm−Tfi)

wherein ϵ is a constant, and Tfi and Tfm represent values of the re-adhesion control signal at the times of the commencement and the termination of the developing period of nonadhesion state, respectively.

13. A control apparatus for a rolling stock as defined in claim 1, wherein there is further provided a signal generator which generates an additional re-adhesion control signal (Tf'') in accordance with the adhesion-state-relative signal ($v_s$), when the relative velocity ($v_s$) exceeds a predetermined reference value ($\delta_2$).

14. A control apparatus for a rolling stock as defined in claim 1, wherein a plurality of electric motors are provided and said processing unit means produces re-adhesion control signals with respect to each of the electric motors, and includes means for selecting a largest one of the re-adhesion control signal as the re-adhesion control signal (Tf).

15. A control apparatus for a rolling stock as defined in claim 1, wherein a plurality of electric motors are provided, the first velocity detection means detects maximum and minimum peripheral velocities of wheels driven by the plurality of electric motors, and the processing unit means produces the re-adhesion control signal (Tf) on the basis of the detected maximum and minimum peripheral velocities.

16. A control apparatus for a rolling stock as defined in claim 1, wherein a plurality of electric motors are provided, and said processing unit means produces the adhesion-state-relative signal in accordance with the difference in voltages appearing across respective electric motors.

* * * * *